3,033,754
TABLETS CONTAINING HYDRAZINE DERIVATIVES

Harold C. Krahnke, Milwaukee, and Wallace E. Becker, Franksville, Wis., assignors, by mesne assignments, to Lakeside Laboratories, Inc., a corporation of Delaware
No Drawing. Filed Dec. 21, 1959, Ser. No. 860,718
6 Claims. (Cl. 167—82)

This invention relates to therapeutic preparations. More particularly, this invention is concerned with a novel tablet composition and processes of producing the same.

Therapeutic agents are desirably administered, when possible, as oral tablet preparations. When the dosage of a therapeutic agent or drug is too small to form a tablet by itself, fillers must be added to bring the tablet to proper size. When such materials do not form a tablet no matter how much pressure is applied, adhesive substances, called binders, are added. To prevent sticking of the tablets to punches and dies a lubricant is added. To facilitate dissolution of the tablet and effect quick release of the therapeutic agent, a disintegrator is added.

Some of the therapeutic agents now in use or being evaluated are very reactive chemically and are poorly compatible with the usual tablet excipients, fillers, binders, disintegrators and lubricants when mixed in either the wet or dry state.

According to the present invention it has been discovered that many highly reactive therapeutic agents can be provided in stable unit dosage tablets comprising the agent, mannitol and a polymer of acrylic acid crosslinked with a polyhydroxy compound having at least 3 and advisably not more than about 8 hydroxyl groups, wherein the hydrogen atoms of at least three hydroxyl groups are replaced with unsaturated aliphatic radicals having at least 2 carbon atoms. The preferred radicals are those containing 2 to 4 carbon atoms, e.g., vinyl, allyl, crotyl, or other ethylenically unsaturated groups.

The crosslinker shall desirably comprise about 0.75% to 2.0%, and advisably about 0.75% to 1.5%, by weight, of the polymer of acrylic acid. Best results are obtained with about 1.0% by weight of the polyhydroxy crosslinking materials.

The polyhydroxy compounds useful as crosslinking materials and as contemplated by the present invention advisably contain 3 or more hydroxyl groups and may include the saccharides, for example, monosaccharides such as glucose, fructose, mannose or galactose, and disaccharides such as sucrose, maltose or lactose. Other useful polyhydroxy compounds include the polyhydroxy alcohols such as glycerol, erythritol, dulcitol, mannitol, sorbitol and pentaerythritol.

The preferred crosslinking compounds are polyallyl sucrose or polyallyl pentaerythritol, and advisably contain at least 3 allyl groups for each molecule of sucrose or pentaerythritol. Five to 6 allyl ether groups per molecule of sucrose, and 4 allyl ether groups for each molecule of pentaerythritol are best.

The preparation of the acrylic acid polymers is described in United States Patent No. 2,909,462, issued October 20, 1959.

The described polymers have a high electrostatic charge. However, this can be vitiated by using steam to agglomerate the polymer particles.

A particularly suitable polymer for use in this invention is formed by polymerizing acrylic acid with approximately 1% by weight of polyallyl sucrose. Such a product is commercially available under the trademark "Carbopol–934" by the B. F. Goodrich Chemical Company. The preparation of this product is also described in United States Patent No. 2,909,462, issued October 20, 1959.

Only a small amount of a polymer of acrylic acid with a crosslinking agent need be employed as the binder in the tablets of this invention. Generally about 4% by weight of the tablet can be the polymer although higher amounts such as up to 10% can be used. The remainder of the tablet weight can comprise mannitol and the therapeutic agent. However, a lubricant such as stearic acid can be included, and usually is, up to about 3% of the tablet weight.

The tablets can be prepared by mixing the mannitol and acrylic acid polymer (such as "Carbopol–934"), moistening the mixture with water, and passing the moistened mixture through a granulating machine. The granules can the be dried in an oven at 110° F., and sieved through a 16 mesh screen. A triturate is then made from a small portion of the granulated mass and the therapeutic agent which is added to the bulk of the granulation. Stearic acid which passes through an 80 mesh screen is blended into the mixture. The blended mixture is then subjected to tableting in the conventional manner to form a tablet containing a predetermined quantity of active ingredient.

Tablets can be produced as described and then coated with a layer of the mannitol-acrylic acid polymer granulated material containing no active therapeutic agent. Such a protective coating is often advisable when the therapeutic agent is reactive to such materials as paper, cotton or other cellulosic substances, as well as with synthetic fibers and fabrics or other common packaging materials, with which the tablet may come in contact. Direct contact of the drug with packaging material is thus prevented and greater stability is assured. Also, the mannitol coating supplies a sweet taste and overcomes the taste of the drug. A color or dye can be dissolved in the distilled water used for moistening the material for formation of the coating granulation. Colored coatings permit inspection for proper centering of cores in the press-coated tablets and also serve to differentiate tablets of different dosages.

The tablets of this invention are particularly suitable for preparing unit dosage forms of phenyl-lower alkyl-hydrazines, which are very reactive chemically and incompatible with the conventional tablet ingredients. The provision of stable tablets containing a phenylalkylhydrazine, such as beta-phenylisopropyl-hydrazine hydrochloride (1-methyl-2-phenylethyl)-hydrazine methylene sulfonic acid, 2-(N-methyl-N-benzyl)-aminoethyl hydrazine dihydrochloride, betaphenylisopropyl hydrazine methane sulfonate or 1-carboethoxy-2-phenylisopropyl hydrazine hydrochloride, will satisfy a significant need because of the therapeutic uses for such products. Thus, these phenylalkyl hydrazines are monoamine oxidase inhibitors useful in the treatment of mental depression, angina pectoris and rheumatoid arthritis. They are essentially psychic energizers which are most useful in the treatment of depressed patients.

Mannitol is the only readily available material totally compatible with phenylalkylhydrazines which can be used as a tablet filler. However, mannitol cannot be tableted without a binder. The described acrylic acid polymers were the only materials suitable as binders which were found compatible with the phenylalkyldrazines. For speed and ease in tableting, a lubricant is also included.

A typical tablet can contain 3 to 75 mg. of a phenylalkylhydrazine, 243 to 265 mg. of mannitol, about 6.0 mg. of stearic acid and about 10 mg. of a polymer as described, producing a tablet ⅜ inch in diameter. However, smaller or larger size tablets can be prepared by adjusting the amounts of mannitol, polymer and stearic acid as long as the ratio of mannitol, polymer and stearic acid are not varied. Thus, another typical tablet can contain 3 to 25 mg. of a phenylalkylhydrazine, 91.5 mg. of mannitol, 3 mg. of stearic acid and about 4 mg. of a polymer as described, producing a tablet ¼ inch in diameter. The material, mannitol, stearic acid and polymer are present in the ratio of about 25:0.6:1.

Another tablet can contain a core having 3 to 25 mg. of beta-phenylisopropylhydrazine hydrochloride, 80.25 to 102.25 mg. of mannitol, 2.75 mg. of stearic acid and about 4 mg. of a polymer as described, and an outer coating compressed onto the core, the compressed outer coating comprising about 292 mg. of mannitol, about 7 to 8 mg. of stearic acid and about 12 to 13 mg. of the polymer.

The following examples are presented to illustrate the invention.

Example 1

2622.535 gm. of mannitol is mixed with 106 gm. of "Carbopol–934" and screened. The mixture is moistened with about 540 ml. of distilled water. The wet mass is passed through a granulating machine and spread on polyethylene lined trays and dried at 110° F. The dried granules are passed through a 16 mesh screen. To a small portion of the granules is added 60 gm. of beta-phenylisopropyl hydrazine hydrochloride with thorough mixing. The mixture is added to the bulk amount of granulation. To this mixture is added 61.25 gm. of stearic acid and the entire amount of material blended. The mixture is compressed into tablets using a ⅜ inch punch and die. The above formulation is based on 10,000 tablets. Each tablet is to contain 6 mg. of beta-phenylisopropyl hydrazine hydrochloride.

Example 2

*Core.*—4962.50 gm. of mannitol and 200 gm. of "Carbopol–934" are blended and screened. The mixture is moistened with approximately 40 fluid ounces of distilled water and the wet mass is passed through a granulating machine. The resulting granules are spread on polyethylene lined trays and dried at 110° F. The dried granules are passed through a 16 mesh screen. To about $\frac{1}{10}$ of the total volume of granules is added 300 gm. of beta-phenyl-isopropyl hydrazine hydrochloride which has been screened to break apart any lumps and insure even distribution. To this is also added 137.5 gm. of stearic acid which has been passed through an 80 mesh screen. The ingredients are mixed thoroughly. The mixture is added to the main bulk of the granulation and blended thoroughly. The tablet cores are compressed in a rotary press coating tablet machine using $\frac{9}{32}$ inch punches and dies to a weight of 112 mg.

*Coating.*—14631.575 gm. of mannitol and 626 gm. of "Carbopol–934" are blended and the mixture is screened. The mixture is moistened with approximately 1 gallon of distilled water. The wet mass is passed through a granulating machine. The resulting granules are spread on polyethylene lined trays and dried at 110° F. The dried granules are passed through a 16 mesh screen and 391.25 gm. of stearic acid are added with thorough blending.

To make a press coated tablet, the previously described core is press coated with the coating granulation in a rotary press coating tablet machine using $\frac{13}{32}$ inch punches and dies, to a total weight of 425 mg. per tablet.

Example 3

*Core.*—The core is the same as described in Example 2.

*Coating.*—1.175 gm. of F.D. and C. Red No. 4 dye is dissolved in a minimum amount of distilled water and then added to 1463.15 gm. of mannitol and mixed to obtain an even distribution of color with the mannitol. The mixture is then added to 13168.42 gm. of mannitol and mixed thoroughly. The colored mannitol is screened to further insure even distribution of the color. To the colored manitol is added 626 gm. of "Carbopol–934" and mixed well. The mixture is moistened with approximately 1 gallon of distilled water. The wet mass is passed through a granulating machine. The resulting granules are spread on polyethylene lined trays and dried at 110° F. The dried granules are passed through a 16 mesh screen and 391.25 gm. of stearic acid is added with thorough blending.

To make a colored press coated tablet, the previously formed core is press coated with the colored coating granulation in a rotary press coating tablet machine using $\frac{13}{32}$ inch punches and dies, to a total weight of 425 mg. per tablet. The above formulation is based on 50,000 tablets.

Example 4

89.0 gm. of mannitol is mixed with 4.0 gm. of "Carbopol–934," 16.5 gm. of (1-methyl-2-phenylethyl)-hydrazine methylene sulfonic acid and 2.5 gm. of stearic acid. The mixture is blended by passage through a No. 20 screen and slugged in the usual way on a tablet slugging machine. The slugs are ground through a No. 20 screen and compressed into tablets using a ¼ inch punch and die. This formulation is for 1,000 tablets. Each tablet is to contain 16.5 mg. of (1-methyl-2-phenylethyl)-hydrazine methylene sulfonic acid.

Example 5

500 gm. of mannitol is mixed with 20 gm. of "Carbopol–934," 20 gm. of 2-(N-methyl-N-benzyl)-aminoethyl hydrazine dihydrochloride and 15 gm. of stearic acid. The mixture is blended by passage through a No. 20 screen and slugged in the usual way on a tablet slugging machine. The slugs are ground through a No. 20 screen and compressed into tablets using a ¼ inch punch and die. This formulation is based on 5,000 tablets. Each tablet is to contain 4 mg. of 2-(N-methyl-N-benzyl)-aminoethyl hydrazine dihydrochloride.

Example 6

1578.1 gm. of mannitol is mixed with 70 gm. of "Carbopol–934" and screened. The mixture is moistened with a quantity of distilled water to obtain a moist granulation. The wet mass is passed through a granulating machine and spread on polyethylene lined trays and dried at 110° F. The dried granules are passed through a 16 mesh screen. To a small portion of the granules is added 164.9 gm. of betaphenylisopropyl hydrazine methane sulfonate with thorough mixing. The mixture is added to the bulk amount of granulation. To this mixture is added 37 gm. of stearic acid and the entire amount of material blended. The mixture is compressed into tablets using a $\frac{5}{16}$ inch punch and die. This formulation is based on 10,000 tablets. Each tablet is to contain 16.49 gm. of betaphenylisopropyl hydrazine methane sulfonate.

Example 7

162.24 gm. of mannitol is mixed with 6.76 gm. of "Carbopol–934" and screened. The mixture is moistened with a quantity of distilled water to obtain a moist granulation. The met mass is passed through a granulating machine and spread on polyethylene lined trays and dried at 110° F. The dried granules are passed through a 16 mesh screen. To a small portion of the granules is added 12 gm. of 1-carboethoxy-2-phenylisopropyl hydrazine hydrochloride with thorough mixing. The mixture is added to the bulk amount of granulation. To this mixture is added 4 gm. of stearic acid and the entire amount of material blended. The mixture is compressed into tablets using a $\frac{5}{16}$ inch punch and die. This formulation is based on 1,000 tablets. Each tablet is to contain 12 mg. of 1-carboethoxy-2-phenylisopropyl hydrazine hydrochloride.

Various changes and modifications of the invention can be made and, to the extent that such variations incorporate

What is claimed is:

1. A unit dosage tablet containing a hydrazine compound as a therapeutic agent, mannitol and a colloidally water-soluble polymer of acrylic acid crosslinked with from about 0.75% to 2.0% of a polyhydroxy compound having the hydrogen atoms of at least 3 of the hydroxyl groups replaced by unsaturated aliphatic radicals.

2. A unit dosage tablet containing a hydrazine compound as a therapeutic agent, mannitol and a colloidally water-soluble polymer of acrylic acid crosslinked with from about 0.75% to 2.0% by weight of the acrylic acid with a crosslinking agent selected from the class consisting of polyallyl sucrose and polyallyl pentaerythritol.

3. A unit dosage tablet containing a phenyl-lower alkylhydrazine, mannitol and a colloidally water-soluble polymer of acrylic acid crosslinked with from about 0.75% to 2.0% by weight of the polymer with a crosslinking agent selected from the class consisting of polyallyl sucrose and polyallyl pentaerythritol.

4. A unit dosage tablet containing beta-phenylisopropyl hydrazine hydrochloride, mannitol, stearic acid and a colloidally water-soluble polymer of acrylic acid crosslinked with from about 0.75% to 2.0% by weight of the polymer with a crosslinking agent selected from the class consisting of polyallyl sucrose and polyallyl pentaerythritol.

5. A stable pharmaceutical composition for oral administration comprising a compressed tablet form of a mixture including 3 to 75 mg. of beta-phenylisopropylhydrazine hydrochloride, 243 to 265 mg. of mannitol, about 6.0 mg. of stearic acid and about 10 mg. of a polymer of acrylic acid crosslinked with about 1% by weight of the acrylic acid with polyallyl sucrose.

6. A stable pharmaceutical composition for oral administration comprising a drug-containing compressed core containing 3 to 25 mg. of beta-phenylisopropyl hydrazine hydrochloride, about 80 to 102 mg. of mannitol, 2.75 mg. of stearic acid and about 4 mg. of a polymer of acrylic acid crosslinked with about 1% by weight of the acrylic acid with polyallyl sucrose, and an outer coating compressed onto the core, the compressed outer coating comprising about 290 mg. of mannitol, about 12.5 mg. of said polymer and about 7 to 8 mg. of stearic acid.

References Cited in the file of this patent
UNITED STATES PATENTS

| | | |
|---|---|---|
| 2,857,313 | Cooper et al. | Oct. 21, 1958 |
| 2,909,462 | Warfield et al. | Oct. 20, 1959 |
| 2,933,532 | Schumann | Apr. 19, 1960 |

OTHER REFERENCES

Carbopol–934, March 1954, pp. 1–11.